United States Patent [19]

Miller et al.

[11] Patent Number: 5,075,795
[45] Date of Patent: Dec. 24, 1991

[54] ELECTRO-OPTIC DEVICE FOR OPTICAL SIGNAL PROCESSING AT HIGH REPETITION RATES

[75] Inventors: R. J. Dwayne Miller; Pierre Basseras, both of Rochester, N.Y.

[73] Assignee: The University of Rochester, Rochester, N.Y.

[21] Appl. No.: 513,525

[22] Filed: Apr. 19, 1990

[51] Int. Cl.$^5$ ................................................ G02F 1/01
[52] U.S. Cl. ...................................... 359/245; 359/246; 359/257; 359/285
[58] Field of Search ............... 350/355, 358, 96.13, 350/356; 372/13

[56] References Cited

U.S. PATENT DOCUMENTS

| | | | |
|---|---|---|---|
| 4,105,953 | 8/1978 | Jernigan | 350/358 |
| 4,443,066 | 4/1984 | Freyre | 350/358 |
| 4,491,384 | 1/1985 | Yamashita et al. | 350/358 |
| 4,896,119 | 1/1990 | Williamson et al. | 330/4.3 |
| 4,979,176 | 12/1990 | Young et al. | 372/13 |

FOREIGN PATENT DOCUMENTS

| | | | |
|---|---|---|---|
| 0060072 | 9/1982 | European Pat. Off. | 350/355 |
| 0164718 | 10/1982 | Japan | 350/358 |
| 0168232 | 10/1982 | Japan | 350/358 |

OTHER PUBLICATIONS

P. Das et al., "Color Image Scanning Using Acousto-Optic Interaction with Surface Waves", SPIE, vol. 84, Laser Scanning Components & Technique (1976), pp. 91–96.

J. C. Postlewaite, et al., *IEEE*, Journal of Quantum Electronics, vol. 24, No. 2, Feb. 1988, p. 411.
P. C. Amundsen, et al., *IEEE*, Journal of Quantum Electronics, vol. QE-23, No. 12, Dec. 1987, p. 2252.
J. M. Dawes, et al., Optics Communications, vol. 65, No. 4, 15 Feb. 1988, p. 275.
W. D. Fountain, Applied Optics, vol. 10, No. 4, Apr. 1971, p. 972.

*Primary Examiner*—Rolf Hille
*Assistant Examiner*—Tan Ho
*Attorney, Agent, or Firm*—Martin LuKacher

[57] ABSTRACT

An electro-optic device, which processes by modulating, switching or gating, a light beam in response to an electrical signal utilizes an electro-optic crystal through which the beam to be processed passes. An electric field is generated by pulses which modulate the crystal's index of refraction and also causes piezoelectric ringing in the crystal. Acoustic energy absorbing material is coupled to the crystal for absorbing the piezoelectrically generated acoustic waves propagating perpendicularly to the applied electric field direction which has been found to be the dominant acoustic mode affecting the birefringence of the crystal and causing the ringing. The field is applied in short pulses (of the order of 10 nsec or less) thereby reducing lower frequencies in the acoustic energy spectrum thereby facilitating the absorption of the ringing energy. The modulation or gating of the optical beam may be carried out at high repetition rates which have heretofore limited the use of electro-optic devices to repetition rates of approximately 1 KHz or less.

10 Claims, 2 Drawing Sheets

ELECTRO-OPTIC DEVICE FOR OPTICAL SIGNAL PROCESSING AT HIGH REPETITION RATES

DESCRIPTION

The present invention relates to electro-optic devices which process an optical signal by modulating the index of refraction presented to the optical signal in accordance with an electrical signal and particularly to such devices wherein ringing (oscillations in the index of refraction and birefringence) which arise from the excitation of acoustic modes (propagation of acoustic pulses) in the device is substantially reduced.

The invention is especially suitable for electro-optic devices which modulate or gate light at high frequencies in response to electrical pulses. Such devices are useful as intracavity Pockels cells in regenerative laser amplifier systems for seeding and extracting pulses from the amplifier. In such applications, the limitation on amplifier repetition rate that is associated with piezoelectric ringing in the Pockels cell is removed by the invention and the repetition rate of the amplifier is then limited only by the pumping rate of the gain medium in the amplifier. Such regenerative amplifiers are the subject matter of U.S. Pat. No. 4,896,119 issued Jan. 23, 1990.

The problem of acoustic ringing (parasitic oscillations) in electrical pulse driven electro-optic devices has heretofore been recognized as arising from the electro-optic crystals also being piezoelectric. Electric field piezoelectric coupling causes acoustic waves to be generated which introduce unwanted modulation (oscillation in the crystal birefringence). It has only very recently been believed that such limitations could not be eliminated entirely. See J. C. Postlewaite, et al. IEEE Journal of Quantum Electronics, Vol. 24, No. 2, February 1988, page 411. Efforts to avoid these parasitic oscillations have involved changing the shape of the electrical pulse, by applying an increase in voltage to the electrodes which establish the field across the electro-optic crystal. See P. C. Amundsen, et al., IEEE Journal of Quantum Electronics, Vol. QE-23, No. 12, December 1987, page 2252. It has also been suggested that damping material be applied to the crystal. See J. M. Dawes, et al., Optics Communications, Vol. 65, No. 4, 15 February 1988, page 275 and W. D. Fountain, Applied Optics, Vol. 10, No. 4, April 1971, page 972.

It has been discovered in accordance with the invention that these parasitic vibrations due to piezoelectric ringing have acoustic modes which selectively effect the crystals index of refraction. While acoustic waves are generated which propagate in all directions by the field gradients at the interface between the crystal and the electrodes which establish the electric field, it has been found that acoustic waves which propagate in the direction transverse to the applied field are the main problem in causing ringing and consequent oscillation in the crystal's birefringence. Previous attempts to damp out the acoustic energy have assumed that the acoustic waves are excited along the applied field direction and have used acoustic damping solely in that direction. See the article by J. M. Dawes, et al., referenced above. The article by W. D. Fountain also recognizes that there are waves which propagate but does not recognize the selective effect of such waves thereby giving no guidance to an effective means for quenching ringing in the birefringence presented by an electro-optic crystal after application of a pulsed field.

The selective effect was discovered by monitoring the change in polarization of a laser beam through a Pockels cell containing an $LiNbO_3$ crystal, which was in this example, $9 \times 9 \times 25$ millimeters and subjected to a 10 nsec, 2 kV pulse at a 1 KHz rate. The change in crystal birefringence was monitored by passing the optical beam through the crystal located between crossed polarizers and photoelectrically detecting the beam after passage through the last polarizer. As shown in curve 1 of FIG. 1, and curve 1 of FIG. 2, with the field applied along the X crystalographic axis and the optical beam passing through the Z axis at a Y location in the center of the crystal, there are 10 nsec pulses followed by pronounced ringing in the modulated light intensity with a beat frequency of 500 KHz which is due to the photoelastic response of the crystal. The ringing is caused by acoustic shear waves that are generated by the field gradients at the crystal/electrode interface. The crystal and its electrodes are shown in the corner of FIG. 1.

FIG. 2, curve 1, shows a regular 2 microsecond beat in the optical transmission which is caused by the intersection of the acoustic shear pulse with the optical sampling region through which the beam passes. This beat is due to the shear pulse undergoing multiple reflections from the crystal's surfaces. The results shown in FIG. 1, curve 1, and FIG. 2, curve 1, were replicated even when strongly attenuating material, acoustically impedance matched to the crystal was applied to a face of the crystal where the field was applied; in other words, to absorb acoustic waves which were assumed to be excited along the applied field direction.

It was determined by scanning the optical probe (the beam) both parallel and perpendicular to the applied field that the excited acoustic modes (the acoustic waves propagating in different directions) have different effects on the refractive index. Scanning the beam along the crystal's center, parallel to the electric field, found virtually no change in the observed acoustic beat pattern. In other words, curve 1 of FIG. 1 and curve 1 of FIG. 2 remain the same.

In contrast, scanning transverse to the applied field (in the Y direction) was found to have a significant effect on the index of refraction and therefore on the crystal's birefringence. By moving the beam along the Y axis (scanning transverse to the applied field), it was shown that the acoustic pulse which is propagated splits into two pulses (curve 1 becomes curve 2 in FIG. 1). This result demonstrates that two counterpropagating pulses are generated, one at each crystal surface. The time of intersection with the optical beam will depend upon the position of the optical beam relative to the crystal surface and coincides with both acoustic pulses only at the center of the crystal. The dominant acoustic mode affecting the crystal birefringence (the index) is therefore perpendicular to the applied field and not parallel to the field as was heretofore believed (see the J. M. Dawes, et al. article referenced above).

It is believed that the acoustic shear pulse propagating perpendicular to the applied field gives rise to the largest birefringence as a result of the anisotropy of the crystal (this is because that electro-optic crystals, such as $LiNbO_3$ crystals are of ionic character without a center of symmetry. Simply stated the lattice of the crystal expands and contracts in a direction transverse and particularly perpendicular to the applied electric field. The counterpropagating acoustic pulses off the crystalographic z axis, as manifested by the split into two pulses in curve 2 of FIG. 1, is believed to be the result of a cancellation effect which occurs along the direction of the applied electric field between different amplitudes of the two piezoelectrically driven acoustic shear pulses and the induced photoelastic birefringence.

Briefly therefore, the invention accomplishes an improved method of electro-optically processing a beam of light with an electro-optic crystal wherein an electric field is established in the crystal to change the index of refraction thereof whereby to rotate the polarization of the light due to the change in birefringence in the crystal, while at the same time generating, piezoelectrically, acoustic waves which propagate in a plurality of directions. The invention involves absorbing the acoustic waves which propagate in the direction which varies the change in the index of refraction thereby reducing and removing oscillations in the crystal s birefringence. Specifically, the direction in which the deleterious acoustic waves propagate is transverse to the direction of the applied electric field. Accordingly, acoustic energy absorbing material is coupled to at least one of the faces of the crystal which is parallel to the direction of the electric field. It was found then that the oscillations in the birefringence disappear as shown in curve 2 of FIG. 2. The improved device is therefore not limited by the need to apply pulses to the electro-optic device spaced in time (at repetition rates) sufficient to allow the piezoelectric ringing in the electro-optic device to decay. The electro-optic devices can then be operated at very high rates limited only by other elements in the system utilizing the electro-optic device. For example, in a regenerative amplifier, the repetition rate of the pulses used for seeding and switch-out (cavity dumping) need be limited only by the pumping rate of the gain medium of the amplifier.

It is an additional feature of the invention that short electric pulses (10 nsec or less) for example, 7 nsec, are used to establish the electric field in the electro-optic crystal of the device. Such faster switching prevents long interaction times of the electric field with the acoustic fields and minimizes the amount of energy transferred to the acoustic mode. It also improves the absorption of the acoustic energy since the spectrum of the short pulses is principally in the high frequency range which is more readily absorbed than lower frequencies of the pulses which are conventionally used, such pulses being in the microsecond or 100 nanosecond range.

The foregoing and other objects, features and advantages of the invention are discussed above and hereinafter in greater detail in connection with the accompanying drawings in which:

FIG. 1 are curves taken wit a Pockels cell having a LiNbO$_3$ crystal as shown in the right-hand corner of FIG. 1, where the electrodes to which the pulses are applied are designed by the + and − signs on opposite sides of the crystal, and the position of the curves 1 and 2 being indicated in the center of the aperture defined by the crystal in position 1 and moved along the y axis to position 2;

Figure 1:
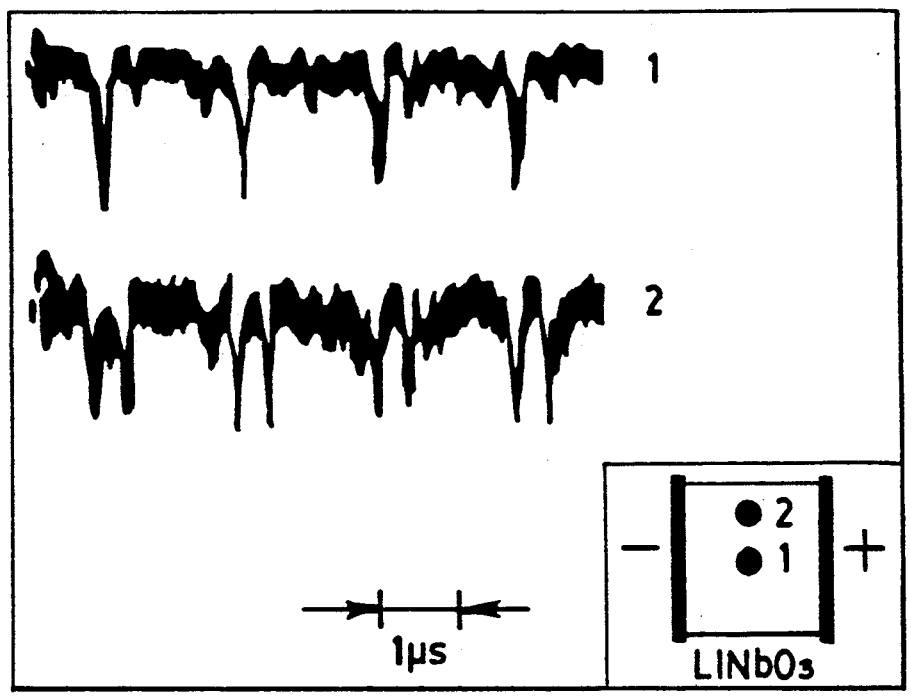
Figure 2:
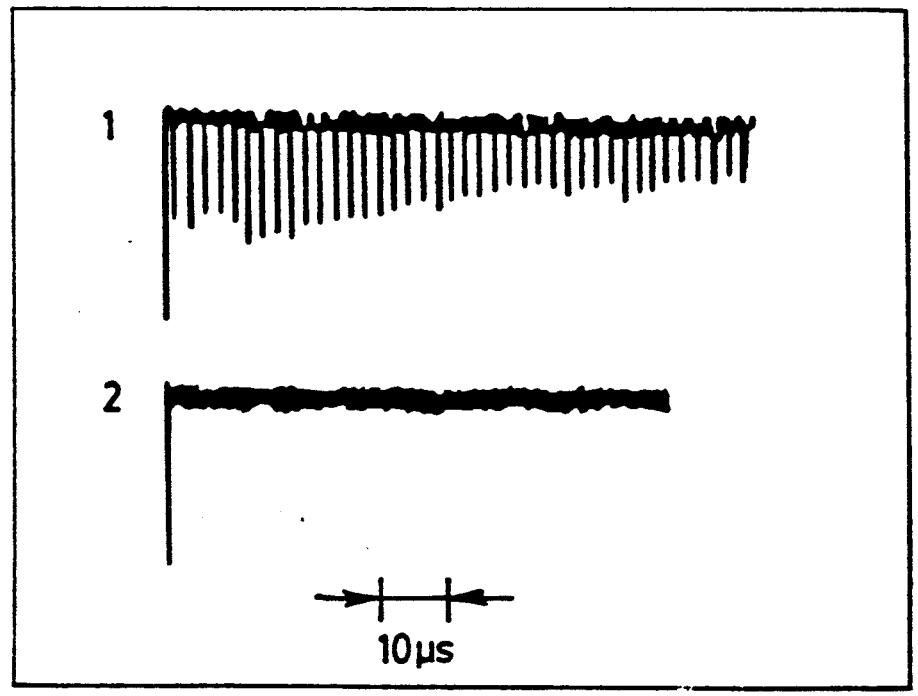
FIG. 2 are two curves showing the comparison of the acoustic birefringence in curve 1 before the invention is applied and in curve 2 with the invention applied.
Figure 3:
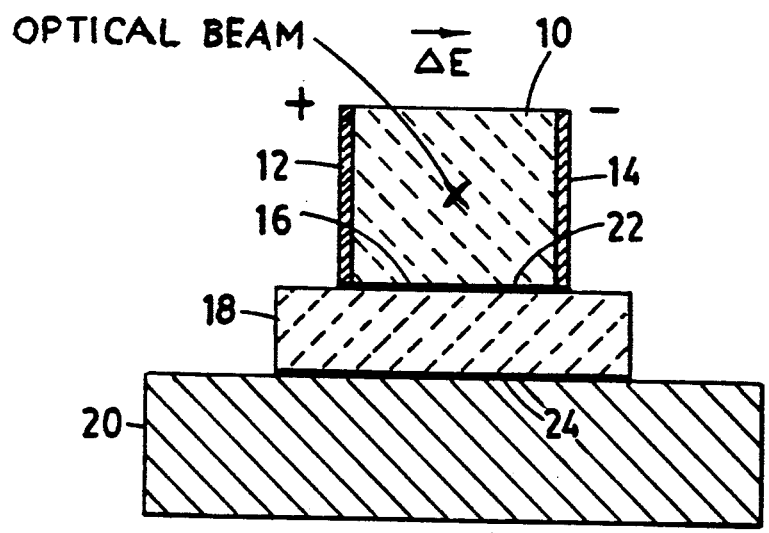
FIG. 3 is a cross-sectional view of an electro-optic device in accordance with an embodiment of the invention.

The curves of FIGS. 1 and 2 were discussed above. The results obtained in FIG. 2, curve 2, were obtained with the device shown in FIG. 3 which utilizes an x cut LiNbO$_3$ crystal 10 having the optical beam to be processed passing through the center of the aperture defined by the crystal. Electrical pulses for establishing the electrical pulse field are applied across electrodes 12 and 14 indicated as gold electrodes. The direction of the field, $\Delta E$, is shown in FIG. 3. The crystal is bonded along a surface 16 perpendicular to the y axis (the y axis being the axis perpendicular to the direction of the applied field) to a fused quartz block 18. In this example, the crystal 10 was a rectangular block 9×9×25 millimeters. The optical beam is transmitted along the z axis which is parallel to the length (the 25 mm. dimension) of the crystal. The quartz block may suitably be 1 cm. thick. It is used to provide electrical isolation and also for impedance matching to an aluminum or lead block 20. Attachment is made with epoxy bonds, several micrometers in thickness. The epoxy provides mechanical contact at 22 and 24 and may be a cyano-based epoxy of low viscosity and high tensile strength. Other elements, for example, another LiNbO$_3$ crystal may be used to provide electrical isolation and couple the acoustic absorbing block 20 to the crystal 10. As noted above and shown in curve 2 of FIG. 2, the piezoelectric acoustic ringing is eliminated to within measurement limits. Also the contrast ratio is better than 100 to 1. In other words, the electro-optic response reduces the transmitted optical signal by a ratio of 100 to 1 when the pulse is present.

The pulse used is preferably a square pulse of 10 nsec or less duration and rise and fall time better than 5 nsec thereby providing acoustic waves which are readily damped by the aluminum or lead block 20 because of the spectral characteristics being essentially devoid of low frequencies (below 1 KHz).

Figure 4:
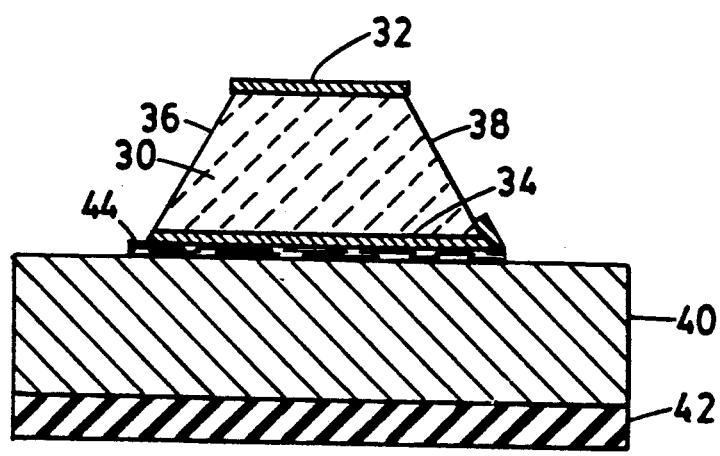
FIG. 4 is a sectional view of an electro-optic device in accordance with another embodiment of the invention.

Referring to FIG. 4, there is shown an electro-optic crystal 30 which suitably is also LiNbO$_3$ but is trapezoidal in cross-section. Electrodes 32 and 34 side faces are inclined at an angle indicated as $\theta$ in FIG. 4, which is suitably about 120°. The electrodes will establish an electric field in what appears to be a direction perpendicular to the acoustic absorbing material. However, the acoustic waves which propagate in the transverse direction, are reflected from the inclined sidewalls 36 and 38 of the crystal and propagate to the absorbing material (a lead or aluminum block 40) covered at the bottom thereof with further damping material 42 which may be elastomeric material such as rubber or polymer (plastic) material. A mechanical bond 44 is suitably made by epoxy cement as was discussed in connection with FIG. 1. The embodiment shown in FIG. 4 has the additional feature of absorbing both the transverse shear waves (which are essentially perpendicular to the field direction) between the electrodes and to longitudinally shear waves which are along the length of the trapezoidal prysmatic body of the electro-optic crystal.

From the foregoing description, it will be apparent that there has been provided improved electro-optic devices and methods of fabricating same. While acoustic absorbing material is shown as being applied to one face of the crystal, wherein it absorbs the acoustic waves which contribute to deleterious parasitic oscillations, acoustic absorbing material may be applied to the opposite face of the crystal (on both surfaces which intersect the y axis). If desired absorbing material may be applied to any remaining surfaces of the crystal. Accordingly, the foregoing description should be taken as illustrative and not in a limiting sense.

We claim:

1. The method of electro-optically processing a beam of light with an electro-optic crystal having an index of refraction which comprises the steps of establishing an electric field in said crystal to change the index of refraction of said crystal and rotate the polarization of the beam of light while generating piezoelectrically electrically, unwanted acoustic waves which propagate in a plurality of directions in the crystal, in one of which directions the waves vary the change in index of refraction to cause unwanted variations in said polarization, and absorbing acoustic waves which propagate in said one direction thereby reducing said unwanted waves and polarization effect.

2. The method according to claim 1 further comprising the step of applying short pulses of the order of 10 nsec or less to generate said field.

3. The method according to claim 1 wherein said one direction is perpendicular to the electric field.

4. The method according to claim 3 wherein said absorbing step is carried out by acoustically coupling absorbing material to a face of said crystal which is parallel to the direction of the field.

5. An electro-optic device for processing an optical signal in response to an electrical signal for reducing introduction of undesired ringing in said optical signal upon processing of said optical signal comprising an electro-optic crystal disposed in an electric field due to said electrical signal when said electrical signal is applied, said field extending in a first direction, and means coupled to said crystal for absorbing acoustic energy propagating in a direction transverse to said first direction thereby reducing said ringing.

6. The device according to claim 5 wherein said crystal is an anisotropic crystal.

7. The device according to claim 6 wherein said crystal is $LiNbO_3$ material.

8. The device according to claim 5 further comprising means responsive to pulses having a duration of the order of 10 nsec or less for generating said field.

9. The device according to claim 8 wherein said optical signal is a light beam which passes through said crystal and means for applying repetitive electrical pulses to provide said field and change the birefringence of said crystal to modulate said beam by changing the polarization thereof.

10. The device according to claim 5 wherein said crystal has opposite surfaces between which extend side surfaces, said side surfaces being inclined with respect to said opposite surfaces and making internal acute angles with one of said opposite surfaces, said acoustic energy absorbing means comprising a body of acoustic absorbing material attached to said one surface, and means for applying said field in a direction between said opposite surfaces.

* * * * *